United States Patent
Hauschild et al.

[11] 3,975,503
[45] Aug. 17, 1976

[54] METHOD FOR PRODUCING ALKALI CARBONATE

[75] Inventors: Ulrich Hauschild; Reimar Musall, both of Hannover; Hans-Jürgen Schröder, Pattensen, Hannover, all of Germany

[73] Assignee: Kali-Chemie Aktiengesellschaft, Hannover, Germany

[22] Filed: Dec. 13, 1974

[21] Appl. No.: 532,365

Related U.S. Application Data

[63] Continuation of Ser. No. 436,719, Jan. 25, 1974, abandoned, which is a continuation of Ser. No. 204,058, Dec. 2, 1971, abandoned.

[30] Foreign Application Priority Data

Dec. 8, 1970 Germany............ 2060287
Aug. 27, 1971 Germany............ 2143008

[52] U.S. Cl................... 423/421; 423/189
[51] Int. Cl.²................... C01D 7/07
[58] Field of Search............ 423/189, 421

[56] References Cited
UNITED STATES PATENTS

| | | |
|---|---|---|
| 3,103,413 | 9/1963 | Blumenthal............ 423/421 |
| 3,202,477 | 8/1965 | Loeffler, Jr. et al............ 423/421 |
| 3,212,848 | 10/1965 | Tasiaux............ 423/421 |
| 3,254,946 | 6/1966 | Hass et al............ 423/421 |
| 3,644,089 | 2/1972 | Minz et al............ 423/421 |
| 3,751,560 | 8/1973 | Neumann............ 423/189 |
| 3,773,902 | 11/1973 | Neumann............ 423/421 |
| 3,870,784 | 3/1975 | Saeman............ 423/421 |

FOREIGN PATENTS OR APPLICATIONS

| | | |
|---|---|---|
| 713,794 | 4/1968 | Belgium............ 423/421 |
| 12,291 | 3/1971 | Japan............ 423/421 |
| 20,143 | 6/1971 | Japan............ 423/421 |
| 895,690 | 5/1962 | United Kingdom............ 423/421 |

*Primary Examiner*—Oscar R. Vertiz
*Assistant Examiner*—Gary P. Straub
*Attorney, Agent, or Firm*—Spencer & Kaye

[57] ABSTRACT

A method for producing alkali carbonate crystals, including adding to an alkali carbonate and alkali hydroxide solution stream a 10 to 75 weight-% alkali hydroxide solution, charging the resulting mixture into a $CO_2$-containing gas whose temperature is from 150° to 700°C, collecting mixture remaining as liquid from the gas at the end of a residence time of mixture in gas of 0.1 to 10 seconds, separating alkali carbonate crystals from the collected mixture, and feeding the collected mixture, following the separating, back in the alkali carbonate and alkali hydroxide solution stream for another adding of alkali hydroxide solution.

14 Claims, 1 Drawing Figure

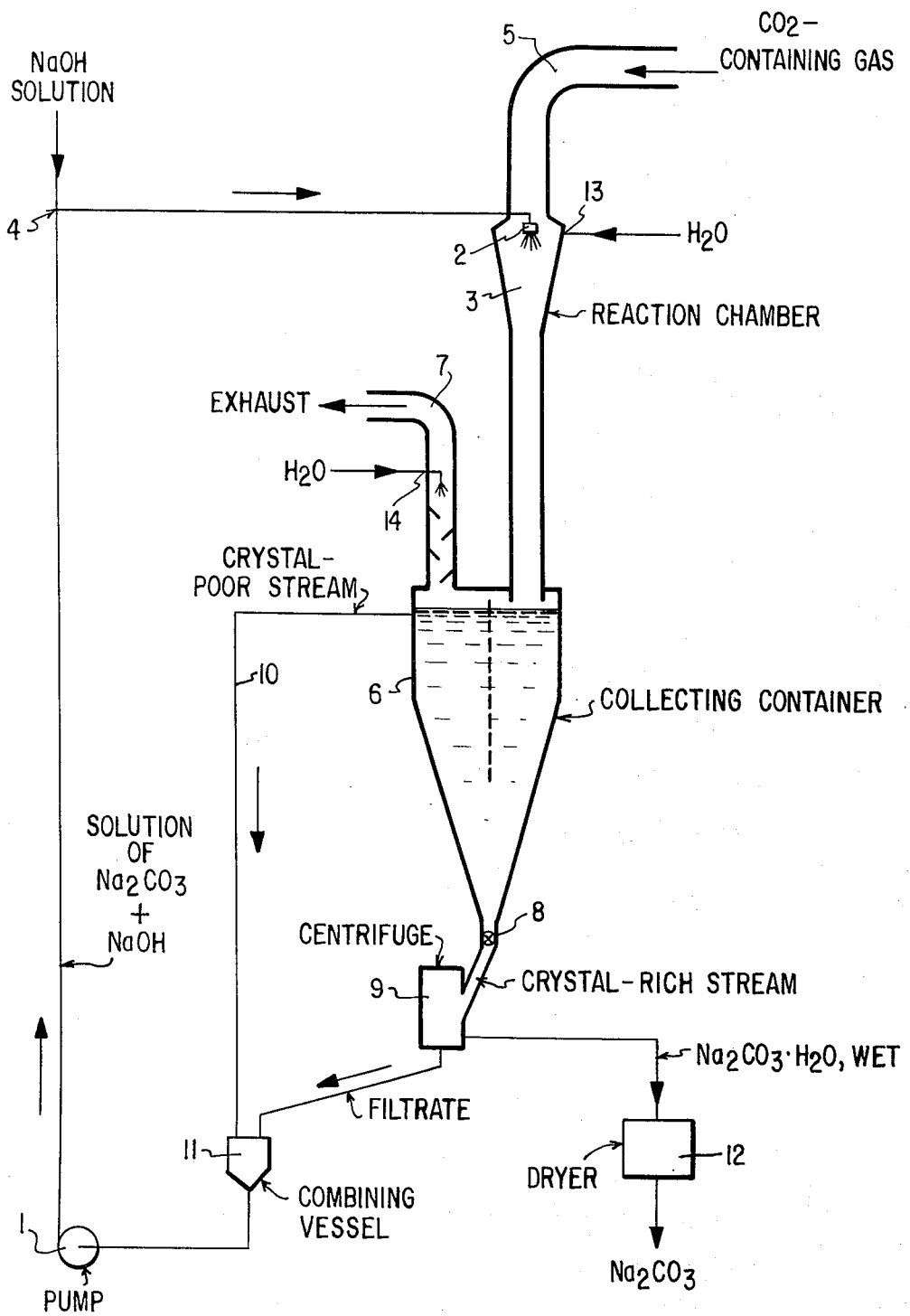

METHOD FOR PRODUCING ALKALI
CARBONATE

CROSS REFERENCE TO RELATED APPLICATION

This application is a continuation of copending application Ser. No. 436,719, filed Jan. 25, 1974, which itself is a continuation of application Ser. No. 204,058, filed Dec. 2, 1971, both now abandoned.

BACKGROUND OF THE INVENTION

The present invention relates to a method for producing alkali carbonate from alkali hydroxide and carbon dioxide.

The production of alkali carbonate from lye by reaction with carbon dioxide or, more generally, carbon dioxide-containing gases has won much interest in the last two years. Due to the increasing need for chlorine in industry, increasing quantities of lye are becoming available through the electrolysis of alkali choride solutions. At least for a portion of this lye, there is no immediate demand.

The known methods for carbonating lyes have serious drawbacks.

A direct carbonating of the usual 50 weight-% sodium hydroxide lye leads, for example, to encrustations and crystal deposits at undesired spots in the apparatus during the conversion using carbon dioxide, and especially during the needed concentrating of the resulting soda solution, by evaporation, after removal of the precipitate. Moreover, the crystals of alkali carbonate often trap within themselves impurities in the form of sodium hydroxide or the small metal particles which are the result of wear. Even the process disclosed in German Published Application (Auslegeschrift) No. 1,138,748, which operates in two stages, cannot eliminate these disadvantages.

Evaporation of the excess water entering a process via the sodium lye may be carried out right in the carbonating stage, so that a special evaporating for concentrating of the above-mentioned soda solution can be eliminated. Since the released heat of neutralization is not large enough to supply the heat needed to evaporate the requisite amount of water, the necessary energy must be supplied either before the reaction, for example by strong heating of the high-percentage sodium lye according to German Laid-Open Application (Offenlegungsschrift) No. 1,567,921, or within the reactor such as in German Laid-Open Application (Offenlegungsschrift) No. 1,811,168 using steam coils. The solids are continuously removed from the hot suspension, while the filtrate, which mainly contains soda, is fed back to the reactor. The carbon dioxide or carbon dioxide-containing gas is bubbled from below through the reactor, which may for example be a carbonating tower or container equipped with a stirring device.

The above-described processes have the disadvantages that they work with a relatively large liquid volume and require a not insignificant expense for electrical energy. Additionally, should there be a failure somewhere in the system to cause the liquid to become still, then a critical situation immediately develops because crystals begin to settle in the carbonating container, pipe lines, pumps, etc., to cause a difficultly removable plugging-up of the system.

In the case of producing potassium carbonate, the practice has been such (See, for example, the description in Winnacker-Küchler, CHEMISCHE TECHNOLOGIE, 3rd Edition (1970), Volume 1, page 222.) that the produced highly soluble potassium carbonate has been formed first dissolved in solution. The solution has had to be concentrated by evaporation. During cooling of the concentrated solution, hydrated potash of formula $K_2CO_3 \cdot 1\frac{1}{2} H_2O$ crystallizes. This is filtered and dried at 120°C to a commercial product containing 84 weight-% $K_2CO_3$. A product substantially free of water of hydration and free of absorbed water is only obtained by drying at 250° to 350°C. The filtrate, containing about 50 weight-% $K_2CO_3$, is mixed with fresh potassium lye and returned to the carbonating stage.

The previous practice for potassium carbonate production has not been satisfactory because, above all, the solution concentrating and crystallizing of carbonate require considerable expense for equipment. Because of the strong temperature dependence of the $K_2CO_3$-solubility, there have been difficulties for continuous operation. Crystal precipitation often has led to the plugging-up of pipe lines, valves, and other equipment.

SUMMARY OF THE INVENTION

An object of the invention, therefore, is to provide a method for the carbonating of both sodium and potassium lyes which, as compared with the methods previously contemplated, is technically simple and which operates economically.

This as well as other objects which will become apparent in the discussion that follows are achieved, according to the present invention, by a method for producing alkali carbonate crystals, including adding to an alkali carbonate and alkali hydroxide solution stream a 10 to 75 weight-% alkali hydroxide solution, charging the resulting mixture into a $CO_2$-containing gas whose temperature is from 150° to 700°C, collecting mixture remaining as liquid from the gas at the end of a residence time of mixture in gas of 0.1 to 10 seconds, separating alkali carbonate crystals from the collected mixture, and feeding the collected mixture, following the separating, back in the alkali carbonate and alkali hydroxide solution stream for another adding of alkali hydroxide solution.

BRIEF DESCRIPTION OF THE DRAWING

The sole FIGURE is a preferred flow diagram of the method according to the present invention.

DESCRIPTION OF THE PREFERRED EMBODIMENTS

The present inventors have discovered a method for producing sodium carbonate, preferably in its monohydrate form, by reacting sodium lye with carbon dioxide or, more generally, carbon-dioxide-containing gases. This method substantially avoids the difficulties of the previously contemplated methods as above-described. The method of the invention is characterized by the feeding of a 10 to 75 weight-% (i.e. grams NaOH per 100 grams solution) aqueous sodium hydroxide solution to a continuously circulated aqueous solution of sodium carbonate and sodium hydroxide, by the charging of the resulting mixture into hot (150° to 700°C) $CO_2$, or $CO_2$-containing gas, as finely divided droplets of the resulting mixture, by collecting that portion of the resulting mixture still remaining as liquid from the gas after a residence time of the resulting mixture in the gas of 0.1 to 10 seconds, by separating the formed, easily filterable carbonate crystals from the collected mixture, and by returning the collected mixture as the continuously circulating aqueous solution of sodium carbonate and sodium hydroxide.

According to a preferred embodiment of the method of the invention, the collected liquid-phase mixture is split into two streams and the formed crystals of sodium carbonate are removed by filtration from only one of the streams with the filtrate and the other stream then being joined and fed back as the circulating aqueous solution of sodium carbonate and sodium hydroxide, to the point where the sodium hydroxide is added.

In contrast to the known processes working in aqueous medium, gas is not introduced in the present invention into liquid and distributed there. Rather, the opposite is done in that a liquid, the resulting mixture, is sprayed into a gas. The hot gas is substantially instantaneously cooled to a temperature between 80° and 120°C, while a portion of the water of the warm (between 75° and 115°C) mixture is transformed to gas in the exhaust from the reaction chamber.

The adding of the sodium hydroxide solution, whose NaOH concentration is preferably between 45 and 55 weight-%, is controlled in such a manner that the extra water which it adds to the circuit is immediately evaporated during the charging into the reaction chamber, due to the heat contained in the hot gas and due also to the heat of neutralization, so that the amount of the alkali carbonate and alkali hydroxide solution eventually circulated back to the step of adding remains constant. Playing a role here are the temperature of the gas, the concentration of $CO_2$ in the gas, and the quantity of the gas, for the higher each of these is, the stronger the evaporation of water. Also the residence times of the charged mixture in the gas and of the gas in the reaction chamber and the degree with which the mixture is divided in the gas have an effect; with smaller droplets and increasing residence times, there is a better utilization of the available heat, and the carbonating of the sodium lye improves.

In place of pure carbon dioxide, gas coming from a burning process, containing about 10 to 20 volume-% $CO_2$, can be used. It depends on the end use of the resulting soda as to what extent a cleaning of these gases of damaging impurities (dust particles or gases) must be carried out. In many cases, a mechanical separating of dust is already sufficient cleaning.

The temperature of the gas can lie within wide limits, principally between 150° and 700°C. Often, gases from burning processes are available at a temperature of 250° to 600°C and possess more heat than required for evaporation of the water in the added sodium hydroxide solution. The volume of the sodium carbonate and sodium hydroxide solution in the circuit can then nevertheless be maintained constant simply by adding some additional water to make up for the extra water evaporated.

Under the prevailing operating parameters, i.e. gas temperature, ratio of gas to liquid, concentration of the added NaOH solution, the $CO_2$ content of the gas, etc., there results a definite temperature at any point on the path of the circulated liquid. After the collecting of the mixture remaining as liquid from the gas, the liquid temperature lies between 75° and 115°C, preferably between 80° and 95°C.

For reasons of economics, attention must be paid to a substantially complete utilization of the $CO_2$. Frequently, especially when using hot exhaust gas from burning processes, there is an excess of $CO_2$ available, so that theoretically the entire NaOH charged to the reaction chamber could be transformed into sodium carbonate. According to the present invention, it is not necessary and even not desired that the entire sodium lye charged to the reaction chamber be carbonated; the portion of the charged lye that is carbonated should be equal to that combined with the sodium carbonate and sodium hydroxide solution in the step of adding. There arises an equilibrium between the degree of carbonation in the sodium carbonate and sodium hydroxide solution circuit and the $CO_2$ content of the gas in the reaction chamber, provided that the other parameters such as temperature, gas and liquid quantities per unit time, etc., are kept constant. If the $CO_2$ content of the gas changes, then the composition of the circuit solution is automatically changed. That is, with increasing $CO_2$ content, the equilibrium quantity of carbonate in the circuit solution increases, and vice versa. On the other hand, the degree of carbonation can be held at a definite value, if, for different $CO_2$ contents, for example the residence time of the liquid in the gas or the size of the liquid droplets is changed correspondingly.

From the above considerations, it is evident that the method of the present invention is easily adaptable and can rapidly be adjusted to changing conditions. Thus, for example, the method of the present invention is suitable for operation under pressures deviating positively or negatively from atmospheric pressure. In such operation, it must be considered that the absorption of $CO_2$ does not momentarily come to an end. Rate of absorption depends on a number of factors. The lower the partial pressure of the $CO_2$, i.e. the lower $CO_2$ concentration, the slower is the carbonating reaction. Increasing temperature likewise slows down the carbonating. The more sodium lye per unit volume to come in contact with the gas and the higher the NaOH concentration, the faster and the greater is the $CO_2$ absorption. While pure $CO_2$, especially at higher pressure, reacts relatively quickly with the charged mixture, operation with exhaust gas from burning processes brings the difficulty that with a fall in the $CO_2$ percentage of the gas there is a decrease in the NaOH content in the charged mixture, so that the conditions for a quantitative absorption of the $CO_2$ become worse in this case.

In spite of this more unfavorable situation in the case of using exhaust gas as compared with pure $CO_2$, there are no real difficulties when exhaust gas is used in the method of the present invention. Should the desired degree of $CO_2$ utilization not be achieved during a residence time of liquid mixture in gas of preferably 0.2 to 3 seconds, then, as already stated above, the mixture is charged with a finer spray, or the residence times are increased. It is possible to feed a portion of the gases exhausted from the reaction chamber back through the reaction chamber, or the liquid in the chamber can be conducted by mechanical deflecting devices, in order to increase the residence times.

The container material for the present invention is corrosion resistant, for example stainless steel, nickel, nickel-contaning metal alloys, and nickel-plated metal; useful for the liquid conducting and containing vessels, pipe lines, and framework, is plastics material such as polyethylene, polypropylene, polytetrafluoroethylene, or plastics-coated steel sheet.

Referring now to the sole FIGURE, a preferred embodiment of the continuously operating method of the invention will be explained.

A $Na_2CO_3$- and NaOH-containing solution circuit is maintained in continuous pipe line flow by pump 1. At connection 4, an aqueous sodium hydroxide solution, as above-described, is added to the sodium carbonate and sodium hydroxide solution circuit. Using the pressure created by pump 1, the resulting mixture is sprayed by nozzle 2 into reaction chamber 3. Hot gas exhausted from a burning process, i.e. $CO_2$-containing gas, is sucked in through pipe line 5 by the action of th sprayed mixture. The mixture and gas come into intimate contact and react immediately. In collecting container 6, mixture remaining as liquid is collected from the gas. The gas, heavily laden with water vapor, is exhausted through pipe line 7. The exhaust gas may be washed with water at connection 14, if desired. In order to prevent a possible encrustation at the level of nozzle 2, water can be sprayed in at connection 13. The carbonated and concentrated mixture remaining as liquid in container 6 contains precipitating crystals of $Na_2CO_3 \cdot H_2O$. These crystals grow rapidly and deposit in the funneling bottom portion of container 6. While a freely flowing crystal-rich stream is continuously withdrawn from the bottom of container 6 through a removal device 8 and into centrifuge 9, a second stream of the charged mixture remaining as liquid is withdrawn from container 6 through pipe line 10. The second stream is a crystal-poor stream having only few, fine, suspended crystals. The second stream is fed directly into combining vessel 11, where it is recombined with the filtrate from the first, crystal-rich stream. From vessel 11, the combined streams are moved through pump 1 in the sodium carbonate and sodium hydroxide solution circuit. The centrifuge-wet sodium carbonate monohydrate is fed into dryer 12, heated directly with $CO_2$-containing gas. The direct contacting of the wet sodium carbonate monohydrate with $CO_2$-containing gas causes, in addition to a drying of the crystals, a carbonating of sodium lye present amongst the carbonate crystals. Drying above 100°C yields a heavy soda product.

As compared with known processes, the method of the present invention has principally the following advantages:

1. Preferred utilization of hot exhaust gas from burning processes;
2. Small liquid volume in the working medium;
3. The gas is sucked into the reaction chamber, so that no gas compressor is necessary;
4. Intensive mixing of liquid and gas — thus short residence times are required;
5. Small and simple equipment;
6. Small electrical energy requirements;
7. Good utilization of the heat energy of the $CO_2$-containing gas;
8. Great flexibility in the system.

Depending on the reaction conditions, there arises in the sodium carbonate and sodium hydroxide solution circuit a certain $Na_2CO_3$ and NaOH concentration. Ordinarily, the total alkali content, expressed as NaOH, lies between 22 and 27 weight-%, and this is the result of the combined effect of the $Na_2CO_3$, at 13 to 18 weight-%, and the NaOH, at 8 to 14 weight-%. The weight ratio NaOH: $Na_2CO_3$ should lie preferably below 1 : 1 before the adding of the sodium lye.

The system potassium lye/potassium carbonate is very different from the system sodium lye/sodium carbonate, because the solubilities and the hydrate steps are quite different. Nevertheless, the method of the present invention can be applied also for the simple and economical production of potassium carbonate.

The method of the present invention for the production of potassium carbonate is preferably characterized by the adding of a 10 to 60 weight-% aqueous potassium hydroxide solution to a circulating aqueous solution of potassium carbonate and potassium hydroxide, by the spraying of the obtained mixture into hot (150° to 700°C) $CO_2$-containing gas, by the collecting of mixture remaining as liquid from the gas after a residence time of 0.1 to 10 seconds, by removing the formed crystals from the collected mixture, and by the returning of the remaining liquid portion as the circulating aqueous solution of potassium carbonate and potassium hydroxide.

The circulating working solution of potassium carbonate and potassium hydroxide contains, before the adding of the potassium lye, a quantity of potassium carbonate and potassium hydroxide such that the total alkali content, expressed as KOH, lies preferably between 45 and 55 weight-%. The KOH content of the solution individually amounts to 8 to 20 weight-%, with that of $K_2CO_3$ lying at from 35 to 52 weight-%.

By spraying the resulting mixture into the hot gas, the gas is substantially instantaneously cooled to a temperature from 80° to 125°C, while the mixture is warmed to 75° to 120°C. Due to the heat introduced by the gas and the released heat of neutralization, a portion of the water in the resulting mixture is evaporated. This portion corresponds exactly to the amount of excess water caused by the adding of the potassium lye and by water added for other reasons as above disclosed. Thus, the volume of the potassium carbonate and potassium hydroxide solution circuit remains constant.

As in the case of sodium carbonate production according to the invention, pure carbon dioxide gas can be used when producing potassium carbonate; it is preferred to use the exhaust gas from a burning process, the exhaust gas containing about 10 to 20 volume-% $CO_2$.

The portion of water evaporated in the reaction chamber is higher, the higher the temperature of the $CO_2$-containing gas, the higher the concentration of $CO_2$ in the gas, and the higher the amount of the gas supplied. Usually, the hot exhaust gas from a burning process contains significantly more heat energy than needed to evaporate excess water in the charged resulting mixture. Thus, the excess water resulting from the added, diluted potassium hydroxide solution, whose KOH concentration lies preferably between 42 and 54 weight-%, cannot cover the water loss caused by the heat in the gas. Therefore, ordinarily, water must be fed in at suitable locations in the apparatus. The amount of heat transferred and the reaction are influenced as in the case of sodium by the degree to which the liquid is divided in the gas and residence times of the liquid in the gas and of the gas in the reaction chamber, for, with smaller droplets and increasing residence times, both heat exchange and degree of conversion to carbonate are increased.

Following the collecting of the mixture remaining as liquid at the end of the chosen residence time of the mixture in the gas, the mixture has a temperature determined by the various process parameters such as the ratio of gas to liquid, the gas temperature, the concentration of the potassium lye, and the $CO_2$-content of the gas. The higher these parameters lie, the higher is the temperature of the collected liquid. Generally, the collected liquid has a temperature from 75° to 120°C, predominantly however in the range of 85° to 105°C.

A determinative factor for the hydrated water content of the potassium carbonate solids obtained according to the invention is the composition of the solution in the potassium carbonate and potassium hydroxide solution circuit. If the $K_2CO_3$ content in the solution is high, for example 50 weight-%, and thus the KOH content is low, then, under the above-given reaction conditions, the precipitation of $K_2CO_3 \cdot 1\frac{1}{2} H_2O$ is favored. In contrast, with increasing KOH content, i.e. with sinking $K_2CO_3$ content, more and more water-free $K_2CO_3$ is obtained in solid form. Thus, it is possible by appropriate measures according to the present invention to obtain in crystal form either the hydrate potash, $K_2CO_3 \cdot 1\frac{1}{2} H_2O$ or the water-free $K_2CO_3$. Preferably, 46 to 52 weight-% $K_2CO_3$ is used for the hydrated carbonate production and 35 to 46 weight-% $K_2CO_3$ for the non-hydrated carbonate production.

The isolating of the potassium carbonate crystals proceeds preferably by dividing the mixture remaining as liquid into two streams as above-described for sodium carbonate. Only the crystalline slurry depositing at the bottom of the collecting container is subjected to filtration or centrifuging. The filtrate and the other stream, which contains relatively little, very fine crystals, are brought back to form the potassium carbonate and potassium hydroxide solution circuit.

The process for potassium carbonate production is likewise very adaptable and can be rapidly adjusted to changing conditions. Here also, pressures above and below atmospheric pressure can be used equally well. Preferably, the charged mixture and gas are allowed to react with one another for 0.2 to 3 seconds. In the exception that this contact time is not sufficient to obtain the desired utilization of the $CO_2$, then the residence times for the liquid in the gas and for the gas in the reaction chamber are increased or the droplet size is decreased. For example a portion of the gas exhausted from the reaction chamber may be fed back to the reaction chamber, or the charged mixture can be deflected by suitable mechanical devices, before the collecting of the mixture remaining as liquid.

The flow diagram for the potassium method is substantially the same as that for sodium — as depicted in the FIGURE; the product is either a defined hydrate or a hydrate-free potassium carbonate. The same advantages over the prior art are obtained by the potassium process that are obtained by the sodium process.

Further illustrative of the present invention are the following examples.

EXAMPLE I

In the process of the FIGURE, 390 kilograms of a warm (80°C) working solution of sodium carbonate and sodium hydroxide were moved in circuit by pump 1. The solution contained 16.6 weight-% sodium carbonate and 11.5 weight-% sodium hydroxide, thus about 24 weight-% total alkali (expressed as (NaOH). Shortly before this solution was sprayed into the reaction chamber, it was continuously mixed with 75 kg/hour 50 weight-% sodium hydroxide solution. By the suction action of the reactor, to which 5 liters per hour water was additionally fed, the resulting mixture came into intimate contact with 150 standard (0°C, 1 atmosphere pressure) cubic meters/hour of hot (480°C) exhaust gas from a burning process. The gas contained 14 volume-% $CO_2$. Following an average residence time of the mixture in the gas equal to about 0.5 seconds, the remaining liquid was separated from the gas in a collecting container of 280 liters capacity. The gas exhausted from the reaction chamber left with a temperature of 85°C and was passed through a small water scrubber in pipeline 7. Rapidly growing crystals of $Na_2CO_3 \cdot H_2O$ settled in the collecting container. At the foot of the container, the thickened crystal suspension was continuously withdrawn and fed into a centrifuge, where 58.1 kg/hour $Na_2CO_3 \cdot H_2O$ with 8 to 10% free water content was separated. The filtrate and the overflow from the collecting container were combined in the combining vessel and then fed again toward the point of NaOH addition. The overflow contained only little suspended crystalline material. The water fed into the system was regulated to maintain the liquid volume in the sodium carbonate and sodium hydroxide solution circuit constant. The moist crystalline product was dried in a dryer heated directly with $CO_2$-containing gases to provide a dewatered heavy soda.

EXAMPLE II

In a process modified from the FIGURE only as indicated in the following, 405 kg of a warm (96°C) working solution of potassium carbonate and potassium hydroxide were moved in circuit by pump 1. The solution had a composition of 45.6 weight-% potassium carbonate and 12.2 weight-% potassium hydroxide, thus 49.2 weight-% total alkali (expressed as KOH). Through connection 4, 46 weight-% potassium hydroxide solution was fed at the rate of 100 kg/hour into the potassium carbonate and potassium hydroxide solution circuit. The resulting mixture reached the reaction chamber, was sprayed into the chamber, and acted to suck into intimate contact with itself 150 standard meters/hour hot exhaust gas from a burning process. The exhaust gas from the burning process had a temperature of 480°C and a $CO_2$-content of 15 volume-%. At the level of the nozzle, 5 liters/hour water was sprayed into the reaction chamber. After an average residence time of about 0.5 seconds in the reaction chamber, the gas and liquid were separated by entrance into the 280 liter collection container. The gas exhausted from the reaction chamber left with a temperature of 98°C after it was passed through a small water scrubber in pipeline 7. The formed crystals grew and settled to the bottom of the collection container. The crystal slurry was continuously withdrawn from the lower end of the funnel section of the collection container and fed to a centrifuge. Per hour, 56.7 kilograms of $K_2CO_3$ product with about 10% free water content was produced. The filtrate was combined with the overflow from the collection container in the combining vessel and fed then back into the potassium carbonate and potassium hydroxide solution circuit. Only relatively little, fine crystals were suspended in the overflow. Water addition to the system in the pipeline exhausting gas from the collecting container and in the spray reactor was able to keep the fluid volume in the solution circuit constant. The warm crystalline material obtained from the centrifuge was immediately fed to a dryer heated directly with $CO_{22}$-containing gas.

The average residence times in the two examples were determined by measuring the quantity of gas sucked from 5 and the volume of the reaction chamber, considering the temperature relations. The volume flow rate for the solution circuit of the 390 kilograms or 405 kilograms respectively at the point of connection 4 was 2.5 cubic meters per hour.

The diameter of the nozzle 2 was 8 mm, the droplet size distribution was estimated by the usual charts and the calculated flow rate.

Heavy soda is a product with a bulk weight of more than 1.05 tons per cubic meter.

It will be understood that the above description of the present invention is susceptible to various modifications, changes and adaptations, and the same are intended to be comprehended within the meaning and range of equivalents of the appended claims.

We claim:

1. A method for producing alkali carbonate crystals, comprising the steps of:
  a. adding to an alkali carbonate and alkali hydroxide recycle stream that contains at least 8% by weight of alkali hydroxide, a 10 to 75 weight-% alkali hydroxide solution to form a resulting solution which has an alkali hydroxide content of at least 8% by weight;
  b. spraying the resulting solution into a $CO_2$-containing gas whose temperature is from 150 to 700°C to react a portion of the alkali hyroxide in said resulting solution with the $CO_2$-containing gas and form a liquid mixture containing alkali carbonate formed from reaction of alkali hydroxide with the $CO_2$-containing gas, the amount of alkali hydroxide being reacted to form alkali carbonate being equal to the amount of alkali hydroxide added to the recycle stream during the step of adding;
  c. collecting said liquid mixture containing said formed alkali carbonate from the gas at the end of a residence time of said mixture in said gas of from 0.1 to 10 seconds;
  d. separating alkali carbonate crystals from the collected liquid mixture, and;
  e. recycling the collected liquid mixture, following the step of separating, as the said alkali carbonate and alkali hydroxide recycle stream to the step of adding.

2. A method as claimed in claim 1, wherein the alkali hydroxide solution added to the alkali carbonate and alkali hydroxide recycle stream is a 45 to 55 weight-% solution.

3. A method as claimed in claim 1, wherein the temperature of the liquid mixture after collection in step (c) is controlled to be at 75° to 115°C.

4. A method as claimed in claim 3, wherein the temperature of the liquid mixture after collection in step (c) is controlled to be at 80° to 95°C.

5. A method as claimed in claim 1, wherein the temperature of the gas in the step of charging is in the range of from 250° to 600°C and wherein the gas temperature at the step of collecting is in the range of from 80° to 120°C.

6. A method as claimed in claim 1, wherein the residence time in the step of charging is in the range of from 0.2 to 3 seconds.

7. A method as claimed in claim 1, wherein the step of separating includes the dividing of the collected mixture into two streams, the removing of alkali carbonate crystals from only one of the streams, and the combining of the two streams, following the step of removing, to form the recycle stream.

8. A method as claimed in claim 1, wherein the alkali carbonate and alkali hydroxide recycle stream contains 13 to 18 weight-% sodium carbonate and 8 to 14 weight-% sodium hydroxide.

9. A method as claimed in claim 1, wherein the alkali carbonate and alkali hydroxide recycle stream contains 35 to 52 weight-% potassium carbonate and 8 to 20 weight-% potassium hydroxide.

10. A method as claimed in claim 9, wherein the alkali carbonate and alkali hydroxide recycle stream contains 46 to 52 weight-% potassium carbonate for producing $K_2CO_3 \cdot 1\frac{1}{2}H_2O$.

11. A method as claimed in claim 9, wherein the alkali carbonate and alkali hydroxide recycle stream contains 35 to 46 weight-% potassium carbonate for producing $K_2CO_3$ free of water of hydration.

12. A method as claimed in claim 1, further comprising drying the alkali carbonate crystals with gas containing $CO_2$.

13. A method as claimed in claim 12, wherein the alkali is sodium and the step of drying is a step for dewatering the sodium carbonate crystals to heavy soda.

14. A method as defined in claim 1, wherein the alkali hydroxide solution that is added to the recycle stream contains 10 to 60 weight-% alkali hydroxide.

* * * * *